US007406583B2

(12) United States Patent
Warrier et al.

(10) Patent No.: US 7,406,583 B2
(45) Date of Patent: Jul. 29, 2008

(54) AUTONOMIC COMPUTING UTILIZING A SEQUESTERED PROCESSING RESOURCE ON A HOST CPU

(75) Inventors: Ulhas Warrier, Beaverton, OR (US); Rajesh S. Madukkarumukumana, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 10/877,483

(22) Filed: Jun. 25, 2004

(65) Prior Publication Data

US 2005/0289283 A1 Dec. 29, 2005

(51) Int. Cl.
*G06F 9/00* (2006.01)
*G06F 13/00* (2006.01)
(52) U.S. Cl. ...................................................... 712/13
(58) Field of Classification Search .................... 712/13; 726/11, 12, 13
See application file for complete search history.

(56) References Cited

U.S. PATENT DOCUMENTS 5,896,499 A * 4/1999 McKelvey .................... 726/11
6,071,190 A   6/2000 Weiss et al.
6,092,110 A * 7/2000 Maria et al. .................. 709/225
6,202,153 B1 * 3/2001 Diamant et al. ............... 726/35
6,668,308 B2 * 12/2003 Barroso et al. ............... 711/141

OTHER PUBLICATIONS

Chess, Palmer, and White, Security in an autonomic computing environment, IBM Systems Journal, vol. 42, No. 1, 2003.
Phoenix Technologies Ltd., Users Manual, PheonixBIOS 4.0, Revision 6, Jan. 6, 2000.

* cited by examiner

*Primary Examiner*—Eric Coleman
(74) *Attorney, Agent, or Firm*—Blakely, Sokoloff, Taylor & Zafman LLP

(57) ABSTRACT

An autonomic computing environment is provided by sequestering one of a plurality of processor resources, partitioning a memory, and hiding an input/output (I/O) device. One processor resource is sequestered such that the sequestered processor resource is not exposed to the remaining processor resources as a processor resource. A memory region is partitioned to provide a service processing portion such that the sequestered processor resource has access to all of the memory region and the remaining processor resources have access to at least a portion of the memory region but do not have access to the service processing portion. A first I/O device is hidden such that the sequestered processor resource has access to the first I/O device and the remaining processor resources do not have access to the first I/O device.

18 Claims, 2 Drawing Sheets

AUTONOMIC COMPUTING UTILIZING A SEQUESTERED PROCESSING RESOURCE ON A HOST CPU

BACKGROUND OF THE INVENTION

Network attacks are growing in numbers and the cost of resulting damages are a concern for enterprises connected to networks. Given the variety of different networks that an enterprise system encounters, it is desirable that protection mechanisms be present at endpoint systems. With increasing complexity of detecting virus signatures, endpoint systems should perform deeper packet inspection that may include maintaining state information and take actions autonomously based on pre-configured policies.

Software tools, such as personal firewalls that run within the host operating system (OS) environment, are the traditional solutions for endpoint network security. However, given the un-trusted OS environments where they run, software tools are prone to tampering and circumvention making it hard to enforce solutions for enterprise network managers. Future solutions should comprehend intelligent policies and mechanisms that not only detect network attacks and problems, but also take needed actions autonomously by the endpoints to protect or recover from those attacks.

Prior art systems for packet inspection may be implemented in software, such as personal firewalls, running in the host operating environment. Such an implementation takes away compute cycles from application processing, thus degrading performance of the host operating environment. Software solutions are subject to security issues such as attacks by malicious viruses, accidental disabling, and the like. Software solutions are affected by changes introduced with different versions and flavors of the OS, which may be changed by the user who is in control of the physical machine and its software configuration.

DETAILED DESCRIPTION OF THE INVENTION

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments of the invention provide mechanisms that may be used to create an isolated service-processing environment on a system that includes multiple processor resources by utilizing host central processing unit (CPU) resource sequestration, memory protection, and input/output (I/O) device hiding. The use of an isolated CPU core as a network and management device and the use of the dedicated processor to run application layer packet filtering may provide a configurable method of utilizing computing resources for the purpose of platform-ready and secure autonomic capability. Embodiments of the invention may provide service processing on host CPU resources in parallel to application processing on other host CPU resources. Embodiments of the invention may be used in chip multi-threading (CMT) and simultaneous multi threading (SMT) processor products. An exemplary embodiment of the invention will be described for enhancing network security with service processing on a sequestered processing resource, such as thread or core, on a host CPU that may be running a commodity operating systems.

Figure 1:
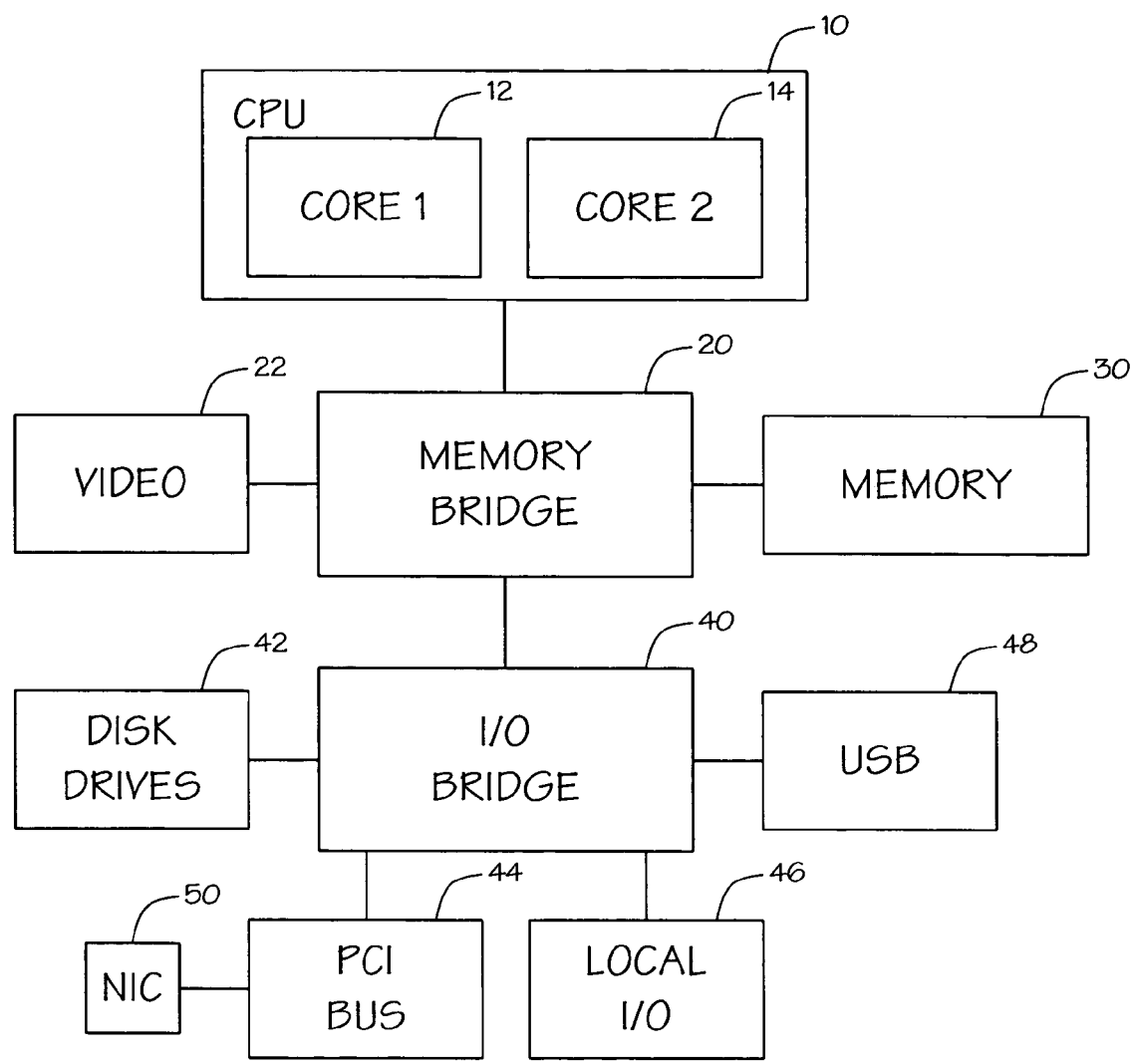
FIG. 1 is a block diagram of an embodiment the invention.

As shown in FIG. 1, a computer system may include a central processing unit (CPU) 10, also referred to as a processor, that includes multiple processor resources 12, 14, also referred to as CPU cores. The CPU 10 may be coupled to a random access memory (RAM) 30. A memory bridge 20 may couple the CPU 10 to the memory 30. The RAM may be any of a variety of types of memory such as synchronous dynamic random access memory (SDRAM), RAMBUS® dynamic random access memory (RDRAM), or extended data out random access memory (EDO RAM).

The computer system may include a number of devices that are coupled to the CPU 10. A video device 22 may provide a visual display that may receive data from the CPU 10 through the memory bridge 20. The memory bridge may also be coupled to an input/output (I/O) bridge 40. The I/O bridge may be coupled in turn to various devices such as disk drives 42, local I/O devices 46 such as timers and power control devices, Universal Serial Bus (USB) 48 connectors, and a Peripheral Component Interconnect (PCI) bus 44 that supports various expansion cards, such as a network interface card (NIC) 50.

The RAM 30 may be loaded with data that represents executable instructions that may be executed by the CPU cores 12, 14. The RAM 30 may further contain locations that are defined to the processor 10 to contain data structures used by the processor to control the execution of the processor such as pointers to routines to be executed when certain conditions are detected, data structures such as push down stacks to temporarily hold data being used by the processor, and other data structures to define the processing environment such as task contexts. It will be understood that the amount of RAM 30 accessible by the processor 10 may exceed the amount of RAM that is physically present in the computer system. Various memory management techniques may be used to manipulate the contents of the physical RAM 30 so that it appears to the processor 10 that all of the accessible RAM is present. The contents of the RAM 30 will be described as though all accessible RAM is physically present to avoid obscuring the operation of the described embodiments of the invention but it should be understood that the structures described as being in memory may not all be in physical memory concurrently and that different memory structures may occupy the same physical memory successively while remaining logically distinct.

Embodiments of the invention may be extended to other areas of enterprise management such as asset management, network management, systems management, security management, and the like. This type of self-managed, self-protecting and self-healing system is an evolving technology generally termed as autonomic computing. The kind of processing required on a platform to support autonomics is broadly termed in this disclosure as service processing. Service processing may be hosted at different parts of the system platform such as NICs 50, chipsets 20, 40, and CPUs 10.

Figure 2:
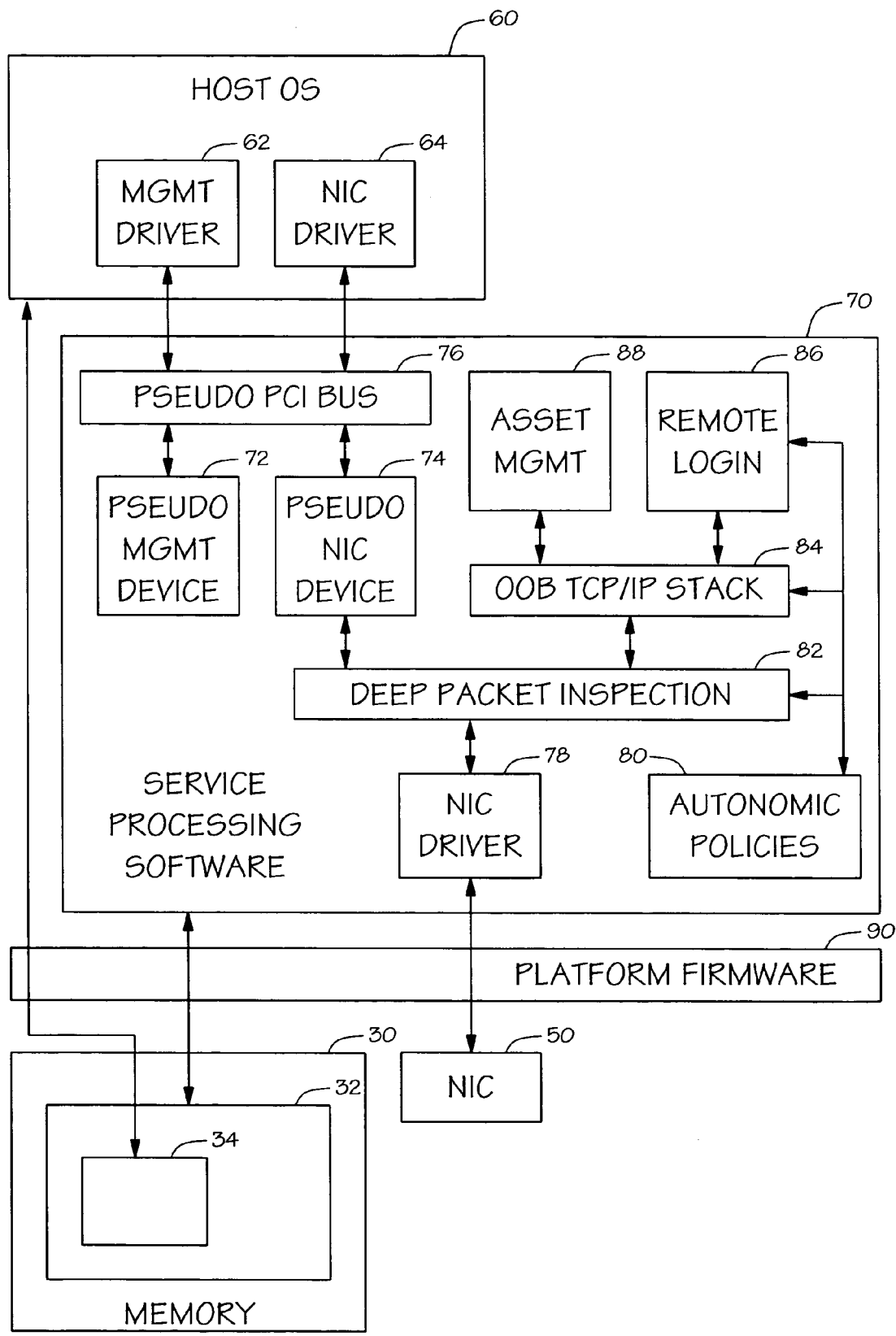
FIG. 2 is a block diagram including a software portion of the embodiment the invention shown in FIG. 1.

FIG. 2 illustrates the relationship between some of the software and hardware elements in an embodiment of the invention. Platform firmware 90, which may include a basic input/output system (BIOS), may load a host operating system (OS) 60 and service processing software 70 into the memory 30. (FIG. 2 does not show the software 60, 70, within the memory 30 to avoid obscuring the details of how the memory is used by the loaded software.) The platform firmware may cause a host CPU processing resource 12, such as a logical thread in a multi-threaded core, or a core in a multi-core socket, to execute the host OS software 60.

Platform firmware 90 may be responsible for enabling service processing on the platform by configuring CPU sequestration, memory partitioning, and I/O device hiding. Upon power up, the platform firmware may bootstrap the service processing software stack 70 on the sequestered processing resource 14 independent of bootstrapping the host OS 60 on other processing units 12.

The platform firmware 90 may create a sequestered CPU resource by configuring a host CPU processing resource 14 that is not executing the host OS 60 so it is not exposed as a processing resource to the host OS. Instead, the service processing software 70 on the sequestered processing resource may present itself to the host OS as one or more I/O devices. The sequestered processing resource may be discovered through peripheral component interconnect (PCI) enumeration and may participate in host OS policies such as device and power management.

The platform firmware 90 may provide memory isolation from the main host memory for service processing by partitioning a region of the memory 30. The platform firmware 90 may configure the system so that each of the processing resources 12, 14 has appropriate memory access. FIG. 2 illustrates allocation of a portion of memory 34 that is accessible by the host OS 60. A larger memory portion 32 may be allocated that is accessible by the service processing software 70. The memory allocation may be such that all or part of the memory portion 34 accessible by the host OS is also accessible by the service processing software. The larger memory portion 32 provides a service processing portion that is accessible only by the service processing software. Thus the sequestered processor resource may have access to all or part of the memory region including the service processing portion. The remaining processor resources may have access to at least a portion of the memory region but not have access to the service processing portion.

The platform firmware 90 may be modified to exclude the service processing portion of the memory in the system physical memory map provided to the host OS, such as through extensible firmware interface (EFI) tables or BIOS interfaces. The system hardware may be enhanced to provide memory partition and protection facilities. The CPU hardware 10 may offer a mechanism such as model specific registers (MSR) to specify the physical memory region base and length reserved for the service processing portion. The mechanism may allow specifying access to the service processing portion as enabled or disabled. In another embodiment (not shown), the service processing portion of memory 30 and the non-service processing portion of memory are distinct non-overlapping portions of the memory. The platform firmware 90 may disable use of the service processing portion for all processing units 12 (cores or threads) doing application processing. The platform firmware may enable use of the service processing portion only on the CPUs 14 allocated for service processing. The service processor 14 may thus see all of the physical memory, but the application processors 12 may not have access to memory reserved for service processing.

A chipset 20, 40 that connects I/O devices 42, 44, 46, 48, 50 to the memory 30 may be modified to provide additional protection by allowing only I/O devices owned by the service processor 14 to access the service processing memory 32. This may be set up through memory access monitors in the memory bridge 20. The memory access monitors may allow transactions to the service processing portion of memory only when generated from specific I/O devices, based on the source identifier.

Service processing for network visibility and security may require ownership and control of specific I/O devices, such as the NIC 50. These I/O devices may need to be kept from being discovered by the host OS 60. Current chipsets may support device hide registers that can be programmed, for example by the platform firmware, with the bus, device, and function details of a specific device. Once programmed, the chipset blocks PCI discovery operations from the OS to that I/O device. The initial PCI bus discovery and configuration, such as device and bridge base address registers (BARs), may be done by the BIOS before enabling the chipset hide registers. Therefore the BIOS may provide the device register addressing information, such as memory and I/O BARs, to the device driver executing on the sequestered processing resource 14.

The host OS 60 may own and manage the interrupt routing through traditional peripheral interface controllers (PICs) and input/output advanced programmable interrupt controllers (I/O-APICs). Therefore, the devices used by the sequestered processing resource may need to support message signaled interrupts (MSIs). The device MSI registers may be programmed to generate only directed interrupts destined to the APIC identifier (ID) of the sequestered processing resource. The chipset may also enforce the delivery of device MSI interrupts based on source ID based redirection. Interrupt messages from devices owned by the sequestered processing resource 14 may always be steered to the sequestered processing resource. Source ID based memory protection and interrupt management may require unique source IDs for each device owned by the sequestered processing resource.

CPU sequestration, memory partitioning, and I/O device hiding mechanisms can be utilized for achieving in-line network visibility and packet inspection as an example service processing usage model. FIG. 1 and show a processor 10 with two cores 12, 14 with one core 14 sequestered and allocated for service processing 70. The platform firmware 90, as part of initialization, may partition a region of the memory 30 into an application portion 34 and a service processing portion 32 and hide one or more I/O devices, such as the NIC 50, from the host OS 60 I/O device discovery and enumeration mechanisms. The service processing software 70 may be implemented as an extension of the platform firmware or BIOS that may run in parallel with the host OS 60. This differs from a prior art system management mode (SMM) BIOS that allows running system management code only on events generated by hardware or the host OS.

The service processing software 70 may load device drivers, such as a NIC driver 78, for hidden I/O devices 50 assigned to the sequestered processor 14. The service processing software may host functions such as deep packet inspection 82, circuit breakers, out-of-band access 84, host OS asset monitoring 88, remote service access 86, autonomics policy management and enforcement 80, and similar service function that may contribute to the security and robustness of the system as a whole. The autonomics policies may specify intelligent policies to identify suspect packet signatures that may identify known worm attacks, perform deep packet analysis, and provide heuristics for protection, recovery, and reporting.

The service processing software 70 may expose a pseudo PCI bus hierarchy 76 to the host OS 60. The host OS may find pseudo I/O devices 72, 74, such as a pseudo NIC 74, through PCI enumeration and load drivers 62, 64 for the discovered pseudo I/O device. For example, the host OS may load a network link driver 64 for the pseudo NIC device 74 that communicates with the host OS network stack. The deep packet inspection module 82 of the service processing software 70 may utilize the autonomics policies 80 to inspect incoming network traffic to the host OS 60 and filter the incoming packets before forwarding them from the platform NIC device 50 to the pseudo NIC 74 seen by the host OS. The deep packet inspection module 82 may also utilize the autonomics policies 80 to inspect outgoing network traffic from the host OS and filter the outgoing packets before forwarding them from the pseudo NIC 74 to the platform NIC device 50.

The service processing software 70 may receive work or completion requests from two sources: the physical I/O device hardware 50 and the host OS driver for the pseudo I/O device 62, 64. To support high performance interfaces with these sources the service processing software may support events and/or interrupts.

The I/O device hardware 50 may use directed APIC interrupts for generating events. If the host OS 60 controls the interrupt controllers in the platform, the hidden I/O devices 50 may be required to support messaged signaled interrupts (MSI). The service processing software 70 or platform firmware 90 may need to guarantee that the MSI address vectors programmed to the hidden I/O devices 50 use a fixed physical destination mode and provide the destination ID of the local APIC of the sequestered processor resource 14. This allows the system to direct interrupts from the hidden I/O hardware 50 to the service processor 14 without any host OS dependencies.

Host OS I/O device drivers, such as NIC drivers, typically communicate with I/O hardware through descriptors (work requests) placed in main memory, possibly using ring or linked-list structures, and ringing a command doorbell device register, which may be memory or I/O mapped, on the I/O device to indicate the availability of the work request. However, since the driver for a pseudo I/O device 62, 64 is communicating with device emulation software 72, 74 running on another core or CPU 14, it may take advantage of optimizations possible in core to core communication.

Rather than using a register-based interface, the host OS pseudo I/O driver 62, 64 may communicate to the service processor's pseudo device module 72, 74 through any available inter-processor synchronization primitives such as shared memory, locking, and the like. In addition, the service processor's pseudo device module can utilize memory monitoring-based synchronization primitives such as MONITOR/MWAIT if the service processor 14 is allowed access to physical memory 34 allocated for the host OS 60. This allows the service processor software 70 to use MWAIT on work requests from the host OS 60 in the service processor idle loop and sleep until it gets work requests through a physical interrupt from the I/O device hardware or by triggering of MWAIT.

In MSI capable host OS environments, the service processor's pseudo I/O device driver 72, 74 can expose MSI support to allow the host OS 60 to program its pseudo MSI capability registers and use inter-processor interrupts (IPI) to send equivalent physical interrupts from the pseudo device to its host OS driver 62, 64.

Embodiments of the invention may isolate the execution of packet inspection code 82 from a host OS 60. Embodiments of the invention may use a general-purpose processing resource 14 with the same industry standard architecture (ISA) as a processing resource 12 that hosts a general purpose operating system 60 which may enable a wider choice of operating environments and applications for service processing 70. Service processing 70 on a host CPU resource 14 may allow sharing of the main memory subsystem 30 for both application and service processing. With proper support for memory partitioning in the chipset and CPU, service-processing memory 32 may be protected for use by only the sequestered resource 14.

Service processing 70 on a host CPU resource 14 may provide an alternative to symmetric multi-processor (SMP) usage of multi-threaded and multi-core CPUs. SMP may be of limited value in some computing environments, such as client processing. Sequestering may expose an isolated processing resource 14 as one or more pseudo I/O devices 72, 74, allowing communication with the host OS 60 on another processing resource 12. Sequestering may be more easily implemented than hard or soft partitioning wherein processing resources are partitioned into independent domains logically and/or electrically with complex chipset partitioning support.

It will be appreciated that embodiments of the invention may be in the form of an article of manufacture that includes a machine-accessible medium. The machine-accessible medium may include data that, when accessed by a processor 10, cause the processor to perform operations. Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Application level packet filtering to provide network visibility and security in a self-protecting capability of an autonomic system merely represents an exemplary embodiment of the invention. Embodiments of the invention may be used for other resource intensive computing usages and extend to functionalities such as encryption/decryption. Embodiments of the invention enable new usage models for multi-threaded and multi-core CPUs other than symmetric multi-processor OS usages.

What is claimed is:

1. A method comprising:
    sequestering one of a plurality of processor cores, the plurality of processor cores being part of a single central processing unit, such that the sequestered processor core is not exposed to the remaining processor cores as a processor core;
    partitioning a memory region of a random access memory to provide a service processing portion such that the sequestered processor core has access to all of the memory region and the remaining processor cores have access to at least a portion of the memory region but do not have access to the service processing portion; and
    hiding a first input/output (I/O) device such that the sequestered processor core has access to the first I/O device and the remaining processor cores do not have access to the first I/O device.

2. The method of claim 1 further comprising:
presenting the sequestered processor core to the remaining processor cores as a second I/O device.

3. The method of claim 2 wherein the second I/O device provides access to the first I/O device for the remaining processor cores.

4. The method of claim 3 wherein the first I/O device is a Network Interconnect (NIC) device, the method further comprising:
performing deep packet inspection with the sequestered processor core on incoming and outgoing network traffic routed through the second I/O device.

5. The method of claim 1 further comprising:
redirecting PCI discovery operations from the remaining processor cores directed to the first I/O device such that the sequestered processor core and not the first I/O device responds to the PCI discovery operations.

6. The method of claim 1 further comprising:
making the service processing portion of the memory region accessible only to I/O devices that are accessible only to the sequestered processor core.

7. A system comprising:
a single central processing unit that includes a plurality of processor cores;
a random access memory coupled to the plurality of processor cores;
a physical input/output (I/O) device coupled to the plurality of processor cores; and
platform firmware that selectively provides the plurality of processor cores access to the random access memory and the physical I/O device wherein the platform firmware
sequesters one of the plurality of processor cores such that the sequestered processor core is not exposed to the remaining processor cores as a processor core,
partitions a region of the random access memory to provide a service processing portion such that the sequestered processor core has access to all of the memory region and the remaining processor cores have access to at least a portion of the memory region but do not have access to the service processing portion, and
hides the physical I/O device such that the sequestered processor core has access to the physical I/O device and the remaining processor cores do not have access to the physical I/O device.

8. The system of claim 7 wherein the platform firmware further:
presents the sequestered processor core to the remaining processor cores as a second I/O device.

9. The system of claim 8 wherein the second I/O device provides access to the first I/O device for the remaining processor cores.

10. The system of claim 9 wherein the first I/O device is a Network Interconnect (NIC) device, wherein the platform firmware further:
performs deep packet inspection with the sequestered processor core on incoming and outgoing network traffic routed through the second I/O device.

11. The system of claim 7 wherein the platform firmware further:
redirects PCI discovery operations from the remaining processor cores directed to the first I/O device such that the sequestered processor core and not the first I/O device responds to the PCI discovery operations.

12. The system of claim 7 wherein the platform firmware further:
makes the service processing portion of the memory region accessible only to I/O devices that are accessible only to the sequestered processor core.

13. A machine-readable medium comprising instructions stored therein which, when executed by a machine, cause the machine to perform operations including:
sequestering one of a plurality of processor cores, the plurality of processor cores being part of a single central processing unit, such that the sequestered processor is not exposed to the remaining processor cores as a processor core;
partitioning a memory region of a random access memory to provide a service processing portion such that the sequestered processor core has access to all of the memory region and the remaining processor cores have access to at least a portion of the memory region but do not have access to the service processing portion; and
hiding a first input/output (I/O) device such that the sequestered processor core has access to the first I/O device and the remaining processor cores do not have access to the first I/O device.

14. The machine-readable medium of claim 13 wherein the operations are further including:
presenting the sequestered processor core to the remaining processor cores as a second I/O device.

15. The machine-readable medium of claim 14 wherein the second I/O device provides access to the first I/O device for the remaining processor cores.

16. The machine-readable medium of claim 15 wherein the first I/O device is a Network Interconnect (NIC) device, wherein the operations are further including:
performing deep packet inspection with the sequestered processor core on incoming and outgoing network traffic routed through the second I/O device.

17. The machine-readable medium of claim 13 wherein the operations are further including:
redirecting PCI discovery operations from the remaining processor cores directed to the first I/O device such that the sequestered processor core and not the first I/O device responds to the PCI discovery operations.

18. The machine-readable medium of claim 13 wherein the operations are further including:
making the service processing portion of the memory region accessible only to I/O devices that are accessible only to the sequestered processor core.

* * * * *